United States Patent [19]

Saito et al.

[11] Patent Number: 4,781,947
[45] Date of Patent: Nov. 1, 1988

[54] SIZING AGENT FOR CARBON FIBERS

[75] Inventors: Makoto Saito, Iruma; Hiroshi Toki, Namekawa; Makoto Miyazaki, Sakado; Hiroshi Inoue, Miyoshi, all of Japan

[73] Assignee: Toa Nenryo Kogyo Kabushiki Kaisha, Tokyo, Japan

[21] Appl. No.: 84,677

[22] Filed: Aug. 12, 1987

[30] Foreign Application Priority Data

Aug. 12, 1986 [JP] Japan .................................. 61-188854

[51] Int. Cl.$^4$ ............................................. C08G 18/04
[52] U.S. Cl. ................... 427/385.5; 428/74;
428/357; 428/368; 528/75; 525/329.7; 525/455;
560/25; 560/115; 560/132; 560/158

[58] Field of Search .................... 528/75; 560/25, 115, 560/132, 158; 525/329.7, 455; 428/74, 357, 368; 427/385.5

[56] References Cited

U.S. PATENT DOCUMENTS 4,443,588  4/1984  Fukuda et al. ......................... 528/75
4,483,759  11/1984  Szycher et al. ....................... 528/75

Primary Examiner—Maurice J. Welsh

[57] ABSTRACT

A sizing agent for a carbon fiber comprized mainly of an unsaturated urethane compound produced by a reaction of an unsaturated alcohol with an isocyanate which is able to couple the carbon fiber with an unsaturated polyester resin or vinylester resin is disclosed. The preferably unsaturated alcohols are allylalcohols and reaction products of an unsaturated carboxylic acids with an alkyleneoxides.

13 Claims, No Drawings

SIZING AGENT FOR CARBON FIBERS

BACKGROUND OF THE INVENTION a. Field of the Invention

This invention relates to a sizing agent for carbon fibers. More particularly, this invention relates to the sized carbon fibers and a carbon fiber composite material made therefrom.

b. Prior Art

Heretofore, it has been suggested to provide a material having high quality such as light weight, high strength and high modulus of elasticity in various industrial fields—motor car industry, airplane industry etc. Recently, an excellent quality of the carbon fiber was developed and the range of application of the carbon fiber was expanded to sports goods or building materials. These applications for the various fields have been primarily used as composite materials of carbon fiber within a matrix resin of a thermosetting resin (e.g., an epoxy resin, an unsaturated polyester resin, a phenol resin, a diarylphthalate resin), a thermoplastic resin (e.g., a polyamide resin, a polyolefin resin, a polyacetal resin, a polycarbonate resin and a linear polyester resin etc.) and so on.

In this case, it is known to use a sizing agent in manufacturing the composite material in order to make a handling of the carbon fiber easy. Moreover, the importance of the selection of the sizing agent is also known to improve the adhesive property of the carbon fiber to the matrix resin, which depends on the surface treatment of the carbon fiber.

Namely, the adhesive property of the carbon fiber to the matrix resin changes, in general, depending on the surface treating agent used for the carbon fiber. Therefore, in a case using an epoxy resin as a matrix resin, for instance, it is preferred to use an epoxy type sizing agent for the carbon fiber to improve it's adhesive property against the epoxy resin.

However, a reduction of production cycle for composite was required, recently, in order to reduce production costs. In such circumstances, composites of carbon fiber with the unsaturated polyester resin (UP) or vinylester resin (VE) came to be important because of the short hardening time of these resins.

In this case, there was a difficulty with conventional methods using the epoxy type sizing agent, since the adhesive property of the treated carbon fiber against both of the unsaturated polyester resin and the vinylester resin is not good, therefore a shearing strength (ILSS) of inter layers of the matrix resin and the carbon fiber is low—the shearing strength can be a standard of the adhesive property.

Sizing agents overcoming some of these defects are disclosed in the Japan Patent Publication No. 43298/'84 but they have not sufficient ILSS.

Generally, the sizing agent is dissolved in a solvent or dispersed into an emulsion, then it is applied to the fiber by means of dipping etc., and the fiber is dried. In time, the solvent or dispersion medium evaporates then the sizing agent itself fuses to cover a surface of the fiber and a thin film of the sizing agent is formed by which the adhesion of the fiber is improved. Therefore, the sizing agent which can adhere to the fiber enough to strengthen an adhesive property of the fiber to a matrix resin is preferable.

The present inventors had discovered that an unsaturated urethane compound having at least one reactive double bond can satisfy the above required condition and be able to used as the sizing agent when an unsaturated polyester or a vinylester is used as the matrix resin.

SUMMARY OF THE INVENTION

A first object of the present invention is to provide a sizing agent for carbon fibers for forming composites of the carbon fiber with an unsaturated polyester or a vinylester.

A second objct of the present invention is to provide a composite material of a carbon fiber with an unsaturated polyester or a vinylester matrix having excellent adhesive properties.

A third object of the present invention is to provide a method for reducing the production cycle of carbon fiber composite materials.

Above objects of the present invention are attained by a sizing agent for carbon fibers comprising reaction products mainly consisting of an unsaturated urethane compound obtained by the reaction of an unsaturated alcohol with an isocyanate compound.

The sizing agent of the present invention can improve the handling of the carbon fiber after the sizing treatment. Moreover, it is compatable with the unsaturated polyester or vinylester and can combine with them by a cross linking reaction, therefore the carbon fibers adhere firmly with these resins and the composite material having high quality can easily be manufactured. According to the present invention, it is passible to reduce the production cycle of the composition, since the unsaturated polyester or vinylester can be used as the matrix resin instead of the conventionally used epoxy resin. The hardening velocity of the former is faster than that of the latter. A reduction of cost of the composition is also possible and the present invention is quite useful.

DETAILED DESCRIPTION OF THE INVENTION

Unsaturated alcohols which are used in the present invention can be selected from such compounds which can react with isocyanates to form the urethane bond. Some of these alcohols are olefin type alcohols, such as allyl alcohol, chrotyl alcohol, 3-butene-1-ol, 3-butene-2-ol, 1-butene-3-ol, 2-butene-1,4-diol, 2-pentene-1-ol, 3-pentene-1-ol, 4-pentene-1-ol, 4-pentene-2-ol, 1-hexene-3-ol, 3-hexene-1-ol, 2-hexene-1-ol, 4-hexene-1-ol, 5-hexene-1-ol; and alkyleneoxide adducts with unsaturated carboxylic acids. The unsaturated carboxylic acids referred herein are acrylic acid, methacrylic acid, chrotonic acid, vinylacetate, angelic acid, ethylchrotonic acid, oleic acid, erucic acid, elaidin acid, maleic acid, fumaric acid, arylmalonic acid, itaconic acid, citraconic acid etc. The allylene oxides include e.g. ethyleneoxide and propyleneoxide, etc.

The isocyanate compounds which can be used in the present invention are arbitrarily selected arbitrarily from known isocyanate compounds, such as tolylenediisocyanate, a di-tolylenediisocyanate, a di-diphenylmethane-di-isocyanate, a dimethyl-diphenylmethane-di-isocyanate, a hexamethylene-di-isocyanate, a metaphenylene-di-isocynate, a propylisocyanate and a butylisocyanate.

The sizing agent for the present invention can be obtained easily by selecting a combination of an above cited unsaturated alcohol and an isocyanate compound, carrying out the urethane forming reaction under a proper condition selected from the known conditions, and then removing an reaction solvent after completion of the reaction.

The sizing agent of the present invention can be a solution or a self emulsifying type which is able to disperse into water by adjusting the amount of the ethyleneoxide or propyleneoxide introduced in it. Moreover, it can not only improve the sizing property of the carbon fiber by making it's molecular weight larger but can also improve the spread ability or flexibility of the carbon fiber by making its's molecular weight smaller.

The polarity of the urethane bond contained in the sizing agent of the present invention is so high that, an affinity of the sizing agent to a functional group, such as —COOH or —OH etc., existing on a surface of the carbon fiber is high. On the other hand, the double bond existing in the sizing agent permits a cross linking reaction with double bonds existing in the unsaturated polyester resins or vinylester resins of the matrix to form strong bonds.

The sizing agent of the present invention produce a coupling effect and combines with both of the surface of the carbon fiber and the matrix resin, therefore, the carbon fiber adheres strongly to matrix resin.

The carbon fiber which is used in the present invention can be selected from known carbon fibers. Either of the fibers—of the so called, polyacrylonitrile type or pitch type—can be used.

The methods to coat the above mentioned sizing agents on the surface of the carbon fiber, include various methods such as spray coating, dip coating etc., using a solution of the sizing agent in a proper solvent, such as methylethyl ketone, or using a dispersed solution of the sizing agent in the form of water-emulsion.

It is useful to have an oxidation treatment on the carbon fiber's surface by a method such as electrolytic oxidation before application of the sizing agent, in order to improve the carbon fiber's surface to which the sizing agent can adhere easily.

It is preferable to use the sizing agent in the form of a water-emulsion type from the view point of cost and ease of application.

In the present invention, leveling agents such as aliphatic alcoholesters (e.g., oleyl olate) can be added into the above coating solution, if useful, to improve the anti-abrasion property of the fiber after the sizing treatment.

The sizing agent of the present invention is excellent in it's adhesive properties to the matrix resin, therefore, it can be used to produced strong composite materials. Some of the matrix resin which are used at this time are thermosetting resins (e.g., an epoxy resin, an unsaturated polyester resin, a vinylester resin, a phenol resin, a diarylphthalate resin etc.) or a thermoplastic resin (e.g., a polyamide resin, a polyolefin resin, a polyacetal resin, a polycarbonate resin, a linear polyester resin, etc.) etc. Of these resins, the unsaturated polyester resins and the vinylester resins are desirable, since these resins have unsaturated bonds which can react with double bonds of the sizing agent to crosslink therewith.

Conditions to harden the matrix resin in order to manufacture the composite material can be selected from known hardening conditions.

The adhesive strength of the composite material thus obtained can be estimated by measuring (e.g. by the short beam method) the inter laminar shearing strength (ILSS). A concrete example of this measurement is as follows; An unidirection CFRP (Carbon fiber-matrix resin composite material) containing 60 volume % of carbon fiber is prepared and is cut into pieces of 2 mm thickness×6 mm width×14 mm length. Setting fulcrums so that a distance between them becomes 10 mm, then ILSS is measured under a condition of cross head speed of 1 mm/minute.

PREFERRED EMBODIMENT OF THE INVENTION

The present invention is explained in more detail by the Examples, however, the present invention is not to be restricted by them.

EXAMPLE 1

26.0 g of the reaction product of a methacrylic acid with 1 mole of ethyleneoxide, 1000 ml of toluene as a solvent and 0.01 g of a hydroquinone as a polymerization inhibitor was put in a reaction vessel having a stirrer, a thermometer, a $N_2$ gas introduction tube, a reagent pour tube and an exhaust aperture, then 25.0 g of a methylene-bis-4-phenylisocyanate (MDi) which is solved in a 500 ml of toluene was added slowly and reacted for 3–5 hours at 90° C.–110° C.

After finishing the reaction, the reaction product was transferred into a mad apple type flask and the solvent was evaporated using a rotary evaporator. Sizing agent 1 was obtained by solving the above product into MEK (Methyl Ethyl Ketone). A main component of the sizing agent 1 was estimated to have the following molecular structure (I) from the results of a chromatogram, an infrared absorption spectrum and of an NMR Spectrum.

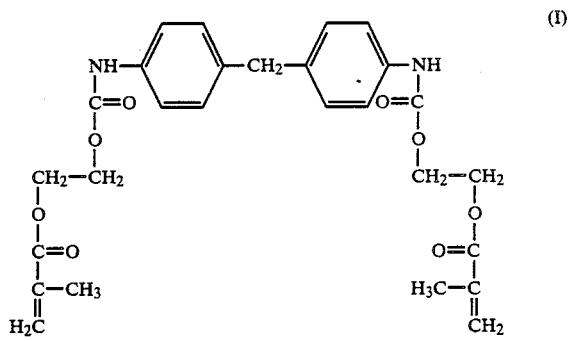

(I)

EXAMPLE 2

39.40 g (0.05 mole) of the reaction product of maleic acid with 4 moles of propyleneoxide and 10 moles of ethyleneoxide, (II)

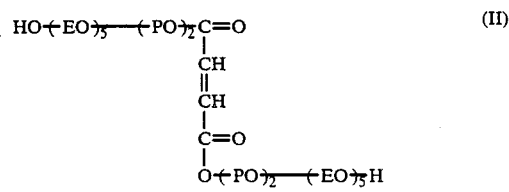

(II)

wherein
PO represents

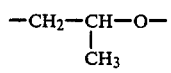

and
EO represents —CH$_2$—CH$_2$—O—

1,000 ml of toluene and 0.01 g of hydroquinone was introduced into the same type reaction vessel which is used at Example 1. Then, 6.53 g (0.0375 mole) of tolylenediisocyanate (2,4-TDi) was added slowly and reacted for 3–5 hours at 90° C.–110° C.

After finishing the reaction, the solvent was removed to get sizing agent 2. The obtained sizing agent was able to use in the form of water-emulsion having an adjusted concentration by adding it into warm water of 70° C.–80° C. slowly under an agitation. The main component of the obtained sizing agent was estimated to have a following structure (III) by analysing the results of chromatograph, infrared absorption spectrum and of NMR spectrum.

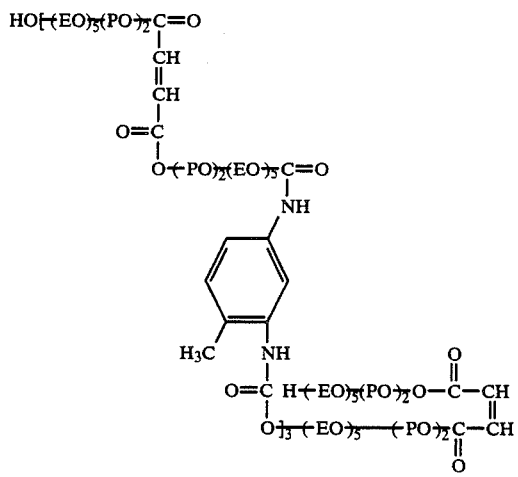

EXAMPLE 3

25.00 g of 2-HEMA (a reaction product of methacrylic acid with 1 mole of ethyleneoxide), 1,000 ml of toluene and 0.01 g of hydroquinone was put in the same reaction vessel which was used in Example 1. Then 17.4 g of 2,4-TDi solved in 500 ml of toluene was added slowly and reacted for 3–5 hours at 90° C.–110° C.

After finishing the reaction, the solvent was removed by using rotary evaporator to get sizing agent 3. The obtained sizing agent was able to be use in a methylethyl ketone solution. The main component of the obtained sizing agent was estimated to have the formula (IV) from the results of chromatograph, infrared absorption spectrum and NMR spectrum.

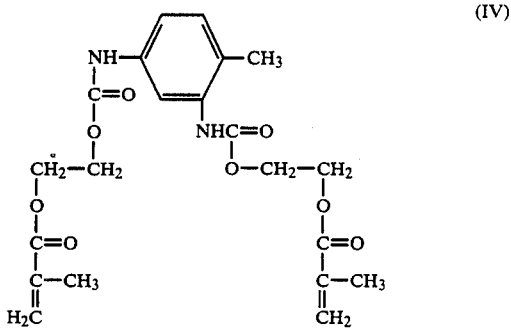

EXAMPLE 4

17.40 g of 2,4-TDi and 500 ml of toluene was put in the same reaction vessel as is used in Example 1, then 0.005 g of hydroquinone and 27.80 g of reaction product of maleic acid with 10 mole of ethyleneoxide (V)

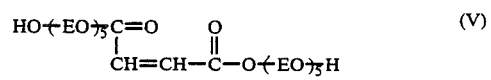

which were solved in 500 ml of toluene were added slowly. After carrying out a reaction for 5 hours at 70° C., 0.005 g of hydroquinone and 13.00 g of 2-HEMA (2-hydroxyethyl methacrylate) solved in 500 ml of toluene were added slowly and carried out the reaction for 5 hours at 90° C.–110° C.

After finishing the reaction, the solvent was removed by using rotary evaporator to get sizing agent 4. The obtained sizing agent was able to use in a form of water-emulsion having an adjusted concentration by adding it into warm water of 70° C.–80° C. slowly. The obtained sizing agent was estimated to have the following formula (VI) from the results of a chromatograph, infrared absorption spectrum and of NMR spectrum.

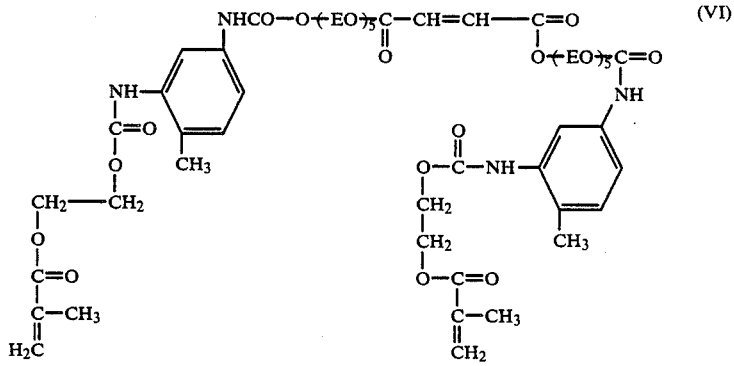

EXAMPLE 5

Using the following three kinds of carbon fibers CF-1, CF-2, CF-3 and sizing agents prepared in Examples 1–4, composite materials of carbon fiber with Upica-3140 (trade name of the unsaturated polyester resin produced by Nippon Yupica Kabushiki Kaisha), Polyset-2167 (trade name of the unsaturated polyester resin produced by Hitachi Kasei Kabushiki Kaisha) and Neopole-8250H (trade name of vinylester resin produced by Nippon Yupica Kabushiki Kaisha) respectively. A bisphenol type epoxy sizing agent (Epikote 828; trade name registered by Yuka Shell Kabushiki Kaisha) were also used in a conventional method for the comparison.

Preparation of the carbon fiber from raw pitch (1) Preparation of CF-1

Using a petroleum pitch for thermal polymerization condensation reaction, a carbon pith having an about 235 C. softening point and an about 55% of optically mesophase was obtained. The mesophase pitch of 98% purity was separated by using a cylindrical centrifugal separator.

Spinning the thus obtained pitch, the obtained spun fiber was stabilized by oxidation. The oxidized pitch fiber was heated at about 1500° C. to get a carbonfiber of high strength, then the surface of the fiber was further oxidized by electrolytic oxidation in order to improve the surface enough for the sizing treatment. Thus the carbon fiber CF-1 was produced.

(2) Preparation of CF-2

The carbon fiber CF-2 having high modulus of elasticity was prepared in a same manner as in CF-1 except that the heating had carried out at 2200° C.

(3) Preparation of CF-3

The carbon fiber CF-3 was prepared by removing a sizing agent from PAN type high strength carbon fiber manufactured by Toray Kabushiki Kaisha (T-300B-6000-50B: trade name registered by Toray, K,K), being treated in a methyl ethyl ketone for two days using a supersonic washing apparatus.

The preparation of composite materials was carried out in the following way; 2 parts of benzoylperoxidei (Kadox B-CH60: Trade name registered by Kayaku Nurie Kabushiki Kaisha) and 0.6 part of peroxy-di-carbonate (Perkadix 16: trade name registered by Kayaku Nurie Kabushiki Kaisha) were used as the hardening agent for 100 parts of each matrix resin; after pressing at 80° C. for one hour, the matrix was heated at 150° C. for an hour to produce the composite materials. Test pieces of 2 mm thickness × 6 mm width × 14 mm length were prepared from the above obtained composite materials.

These test pieces were unidirection CFRP containing 60 volume % of carbon fiber.

Using above test pieces, the ILSS ($kg/mm^2$) were measured in a condition of (a) a distance between two fulcrums: 10 mm, (b) cross head speed: 1 mm/minute.

The results when CF-1, as the carbon fiber, and the Upica-1340, as the matrix resin, had been used were shown in Table 1.

TABLE 1

|  | Sizing agent | solvent | *conc. in solvent (wt %) | coated weight on *CF (wt %) | ILSS |
|---|---|---|---|---|---|
| comparative | — | — | — | — | 7.0 |
| This-invention | (1) | MEK | 2.5 | 1.8 | 8.7 |
|  | (2) | water | 2.0 | 1.7 | 8.8 |
|  | (3) | MEK | 2.5 | 1.8 | 8.7 |
|  | (4) | water | 2.0 | 1.8 | 8.9 |
| comparative | epoxy | MEK | 2.5 | 1.6 | 7.5 |

*conc.: concentration, *CF: carbon fiber

The results of Table 1 proves that the sizing agents of the present invention are quite useful for a composite of high strength carbon fiber derived from pitch with an unsaturated polyester matrix.

EXAMPLE 6

The results when CF-1, as the carbon fiber, and Polyset-2167, as the matrix resin, had been used were shown in Table 2.

TABLE 2

|  | Sizing agent | solvent | *conc. in solvent (wt %) | coated weight on *CF (wt %) | ILSS |
|---|---|---|---|---|---|
| comparative | — | — | — | — | 6.8 |
| This-invention | (1) | MEK | 2.5 | 1.8 | 8.5 |
|  | (4) | water | 2.0 | 1.8 | 8.7 |
| comparative | epoxy | MEK | 2.5 | 1.6 | 7.2 |

*conc.: concentration, *CF: carbon fiber

The results of Table 2 also proves that the sizing agents of the present invention are quite useful for a composite of a high strength carbon fiber derived from a pitch with an unsaturated polyester matrix resin.

EXAMPLE 7

The results when CF-1, as the carbon fiber, and Neopole-8250H, as the matrix resin, had been used were shown in Table 3.

TABLE 3

|  | Sizing agent | solvent | *conc. in solvent (wt %) | coated weight on *CF (wt %) | ILSS |
|---|---|---|---|---|---|
| comparative | — | — | — | — | 7.8 |
| This-invention | (1) | MEK | 2.5 | 1.8 | 9.2 |
|  | (2) | water | 2.0 | 1.7 | 9.3 |
|  | (4) | water | 2.0 | 1.8 | 9.5 |
| comparative | epoxy | MEK | 2.5 | 1.6 | 8.1 |

*conc.: concentration, *CF: carbon fiber

The results of Table 3 proves that the sizing agent of the present invention are quite useful for a composite of high strength carbon fiber derived from a pitch with a vinylester matrix resin.

EXAMPLE 8

The results when CF-2, as the carbon fiber, and Upica-3140, as the matrix resin, had been used shown in Table 4.

TABLE 4

|  | Sizing agent | solvent | *conc. in solvent (wt %) | coated weight on *CF (wt %) | ILSS |
|---|---|---|---|---|---|
| comparative | — | — | — | — | 6.2 |
| This-invention | (1) | MEK | 2.5 | 1.7 | 7.8 |
|  | (3) | MEK | 2.5 | 1.7 | 7.7 |
|  | (4) | water | 2.0 | 1.6 | 8.0 |
| comparative | epoxy | MEK | 2.5 | 1.5 | 6.8 |

*conc.: concentration, *CF: carbon fiber

The results of Table 4 proves that the sizing agents of the present invention are quite useful for a composite of a carbon fiber derived from a pitch, obtained under a high heating temperature and has high modulus elasticity, with an unsaturated polyester matrix resin.

EXAMPLE 9

The results when CF-2, as the carbon fiber, and Neopole-8250H, as the matrix resin, had been used were shown in Table 5.

TABLE 5

| Sizing agent | solvent | *conc. in solvent (wt %) | coated weight on *CF (wt %) | ILSS |
|---|---|---|---|---|
| comparative | — | — | — | 7.0 |
| This-invention (1) | MEK | 2.5 | 1.7 | 8.5 |
| (4) | water | 2.0 | 1.6 | 8.9 |
| comparative epoxy | MEK | 2.5 | 1.5 | 7.5 |

*conc.: concentration, *CF: carbon fiber

The results of Table 5 prove that the sizing agent of the present invention is quite useful for a composite of a carbon fiber derived from a pitch, obtained under a high heating temperature and has high modulus elasticity, with a vinylester matrix resin.

EXAMPLE 10

The results when CF-3, as the carbon fiber, and Upica-3140, as the matrix resin had used were shown in Table 6.

TABLE 6

| Sizing agent | solvent | *conc. in solvent (wt %) | coated weight on *CF (wt %) | ILSS |
|---|---|---|---|---|
| comparative | — | — | — | 7.1 |
| This-invention (1) | MEK | 2.5 | 1.8 | 8.8 |
| (2) | water | 2.0 | 1.6 | 8.9 |
| comparative epoxy | MEK | 2.5 | 1.7 | 7.8 |

*conc.: concentration, *CF: carbon fiber

The results of Table 6 proves that the sizing agent of the present invention is useful for the carbon fiber derived from PAN fiber as same as for the carbon fiber derived from pitch.

EXAMPLE 11

The results when CF-3, as the carbon fiber, and poly-set-2167, as the matrix resin, had been used were shown in Table 7.

TABLE 7

| Sizing agent | solvent | *conc. in solvent (wt %) | coated weight on *CF (wt %) | ILSS |
|---|---|---|---|---|
| comparative | — | — | — | 7.0 |
| This-invention (2) | water | 2.0 | 1.6 | 8.8 |

*conc.: concentration, *CF: carbon fiber

EXAMPLE 12

The results when CF-3, as the carbon fiber, and Neopole-8250H, as the matrix resin, had been used were shown in Table 8.

TABLE 8

| Sizing agent | solvent | *conc. in solvent (wt %) | coated weight on *CF (wt %) | ILSS |
|---|---|---|---|---|
| comparative | — | — | — | 8.0 |
| This-invention (2) | water | 2.0 | 1.6 | 9.3 |
| comparative epoxy | MEK | 2.5 | 1.7 | 8.5 |

*conc.: concentration, *CF: carbon fiber

What is claimed is:

1. A composite material comprising carbon fibers embedded in a matrix comprising an unsaturated polyester resin or a vinyl ester resin wherein said carbon fibers are pre-coated with a sizing agent comprising an unsaturated urethane compound consisting of the reaction products of an isocyanate compound with at least one unsaturated alcohol selected from the group consisting of alkene alcohols having at least one unsaturated group and the unsaturated alcohols prepared by the reaction of unsaturated carboxylic acids with at least one alkylene oxide.

2. The process for sizing carbon fibers fillers for carbon fiber-based composites comprising said fibers incorporated into a matrix comprising at least one unsaturated polyester resin and/or vinyl ester resin comprising the step of sizing said carbon fiber with a coating composition comprising an unsaturated urethane compound consisting of the reaction product of an isocyanate compound with at least one unsaturated alcohol selected from the group consisting of alkene alcohols having at least one unsaturated group and the unsaturated alcohols prepared by the reaction of unsaturated carboxylic acids with at least one alkylene oxide.

3. The process according to claim 2 wherein said urethane sizing composition is capable of cross-linking with said matrix resins.

4. The process according to claim 2 wherein said unsaturated urethane compound has at least two unsaturated double bonds.

5. The process according to claim 2 wherein said unsaturated alcohol is selected from the group consisting of allyl alcohol and the reaction products of unsaturated carboxylic acids with alkylene oxides.

6. The process according to claim 5 wherein said alkylene oxide is selected from the group consisting of ethylene oxide and propylene oxide and mixtures thereof.

7. The process according to claim 2 wherein said coating composition comprises said unsaturated urethane, emulsified in water.

8. Carbon fibers for incorporation into polymeric composites comprising carbon fibers coated with a sizing composition comprising an unsaturated urethane compound resulting from the reaction of an isocyanate with an unsaturated alcohol having at least one double bond.

9. The carbon sized fibers according to claim 8 wherein said carbon fibers are pretreated on their surface by electrolytic oxidation.

10. The sized carbon fibers according to claim 8 wherein said urethane compound is selected from the group consisting of the reaction products of an isocyanate with an unsaturated alcohol selected from the group consisting of alkene alcohols having at least one unsaturated group and the unsaturated alcohols prepared by the reaction of unsaturated carboxylic acids with at least one alkylene oxide.

11. The sized fibers according to claim 10 wherein said unsaturated urethane is formed with at least one unsaturated alkene alcohol selected from the group consisting of allyl alcohol, chrotyl alcohol, 3-butene-1-ol, 3-butene-2-ol, 1-butene-3-ol, 2-butene-1, 4-diol, 2-pentene-1-ol, 3-pentene-1-ol, 4-pentene-1-ol, 4-pentene-2-ol, 1-hexene-3-ol, 3-hexene-1-ol, 2-hexene-1-ol, 4-hexene-1-ol, 5-hexene-1-ol.

12. The sized carbon fibers according to claim 10 wherein said unsaturated carboxylic acid is selected from the group consisting of at least one of acrylic acid, methacrylic acid, chrotonic acid, vinyl acetate, angelic acid, ethyl chrotonic acid, oleic acid, erucic acid, elaidic acid, maleic acid, fumaric acid, arylmalonic acids, itaconic acid and citraconic acid.

13. The sized carbon fibers according to claim 10 wherein said alkylene oxide is selected from the group consisting of ethylene oxide, propylene oxide and mixtures thereof.

* * * * *